US010693716B2

(12) United States Patent
Patil et al.

(10) Patent No.: US 10,693,716 B2
(45) Date of Patent: Jun. 23, 2020

(54) BLOCKCHAIN BASED DEVICE MANAGEMENT

(71) Applicant: AT&T Mobility II LLC, Atlanta, GA (US)

(72) Inventors: Basavaraj Patil, Dallas, TX (US); M Mobeen Khan, Parker, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 8 days.

(21) Appl. No.: 15/991,876

(22) Filed: May 29, 2018

(65) Prior Publication Data
US 2019/0372834 A1 Dec. 5, 2019

(51) Int. Cl.
*H04L 12/24* (2006.01)
*H04W 8/04* (2009.01)
(Continued)

(52) U.S. Cl.
CPC ........ *H04L 41/0806* (2013.01); *H04L 9/0637* (2013.01); *H04L 41/085* (2013.01);
(Continued)

(58) Field of Classification Search
USPC ........................................................ 709/220
See application file for complete search history.

(56) References Cited

U.S. PATENT DOCUMENTS 9,569,771 B2 2/2017 Lesavich et al.
9,774,578 B1 9/2017 Ateniese et al.
(Continued)

FOREIGN PATENT DOCUMENTS

KR 101778768 9/2017
WO 2017095036 6/2017
(Continued)

OTHER PUBLICATIONS

Blockchain and the Internet of Things: The IoT Blockchain Opportunity and Challenge, Available online at https://www.i-scoop.eu/blockchain-distributed-ledger-technology/blockchain-iot/, Accessed on Jun. 4, 2018, 9 pages.
(Continued)

*Primary Examiner* — Hermon Asres
(74) *Attorney, Agent, or Firm* — Kilpatrick Townsend and Stockton LLP

(57) ABSTRACT

Techniques are disclosed herein for employing blockchain for managing devices. Information for the devices may be stored in a blockchain ledger on a computer system that is part of a blockchain fabric. The computer system may include memory, a network interface and a processor. The memory may store a portion of a blockchain ledger for managing a plurality of devices, wherein the blockchain ledger comprises a plurality of blocks, each block comprises a plurality of transactions, and each transaction is associated with one of the devices. The network interface may receive a transaction, wherein the transaction comprises a unique identifier and configuration information for a device. The processor may determine that the computing server is authorized to issue the transaction to update the blockchain ledger, and cause the update to the blockchain ledger using the transaction.

20 Claims, 9 Drawing Sheets

(51) Int. Cl.
*H04L 9/06* (2006.01)
*H04W 8/26* (2009.01)
*H04W 84/18* (2009.01)

(52) U.S. Cl.
CPC ............... *H04W 8/04* (2013.01); *H04W 8/26* (2013.01); *H04L 2209/38* (2013.01); *H04W 84/18* (2013.01)

(56) References Cited

U.S. PATENT DOCUMENTS

| | | | |
|---|---|---|---|
| 9,871,775 | B2 | 1/2018 | Biggs et al. |
| 2015/0379510 | A1 | 12/2015 | Smith |
| 2016/0261690 | A1 | 9/2016 | Ford |
| 2016/0299918 | A1 | 10/2016 | Ford |
| 2017/0046664 | A1 | 2/2017 | Haldenby et al. |
| 2017/0054611 | A1 | 2/2017 | Tiell |
| 2017/0169363 | A1 | 6/2017 | Salmasi et al. |
| 2017/0201582 | A1 | 7/2017 | Zhang et al. |
| 2017/0206532 | A1 | 7/2017 | Choi |
| 2017/0220998 | A1 | 8/2017 | Horn et al. |
| 2017/0302663 | A1* | 10/2017 | Nainar .................. H04W 4/70 |
| 2017/0310653 | A1* | 10/2017 | Zhang ................ H04L 9/0637 |
| 2017/0310747 | A1 | 10/2017 | Cohn et al. |
| 2017/0345019 | A1 | 11/2017 | Radocchia et al. |
| 2017/0346848 | A1 | 11/2017 | Smith et al. |
| 2018/0001184 | A1 | 1/2018 | Tran et al. |
| 2018/0006826 | A1 | 1/2018 | Smith et al. |

FOREIGN PATENT DOCUMENTS

| | | | |
|---|---|---|---|
| WO | WO 2017/127564 | * | 7/2017 |
| WO | 2017187397 | | 11/2017 |
| WO | 2017203093 | | 11/2017 |
| WO | 2017207314 | | 12/2017 |
| WO | 2018020373 | | 2/2018 |
| WO | 2018020375 | | 2/2018 |
| WO | 2018044282 | | 3/2018 |

OTHER PUBLICATIONS

Blockchain for the Internet of Things, Tata Consultancy Services, tcs.com, White Paper, Available online at https://www.tcs.com/content/dam/tcs/pdf/technologies/internet-of-things/abstract/Blockchain%20for%20the%20IoT.pdf, 2016.

Combining IoT and Blockchain Toward New Levels of Trust, Available online at https://www.technologyreview.com/s/609932/combining-iot-and-blockchain-toward-new-levels-of-trust/, Jan. 9, 2018, 4 pages.

How to Secure the Internet of Things (IoT) With Blockchain, Available online at https://datafloq.com/read/securing-internet-of-things-iotwithblockchain/2228, Accessed on Jun. 4, 2018, 13 pages.

Implement your First IoT and Blockchain Project, Available online at https://www.ibm.com/internet-of-things/spotlight/blockchain, Accessed on Jun. 4, 2018, 9 pages.

Bahga et al., Blockchain Platform for Industrial Internet of Things, Journal of Software Engineering and Applications, vol. 9, No. 10, Available online at http://www.scirp.org/journal/PaperInformation.aspx?paperID=71596Proposes, Oct. 28, 2016, pp. 533-546.

De, Cisco Seeks to Protect Blockchain System for IoT Device Tracking, Available online at https://www.coindesk.com/cisco-details-internet-ofthings-blockchain-systemin-patent-application/, Oct. 20, 2017, 4 pages.

Forrest, Chronicled Releases Open Registry for IoT Built on Blockchain, Available online at https://www.techrepublic.com/article/chronicled-releasesopen-registry-for-iotbuilt-on-blockchain/, Aug. 24, 2016, 7 pages.

Kshetri, Using Blockchain to Secure the Internet of Things, Available online at https://www.scientificamerican.com/article/using-blockchain-to-secure-the-internet-of-things/, Mar. 10, 2018, 10 pages.

Marr, Blockchain and the Internet of Things: 4 Important Benefits of Combining These Two Mega Trends, Available online at https://www.forbes.com/sites/bernardmarr/2018/01/28/blockchain-and-the-internet-of-things-4-important-benefits-of-combining-these-two-mega-trends/, Jan. 28, 2018, 2 pages.

Ouaddah et al., FairAccess: A New Blockchain-Based Access Control Framework for the Internet of Things, Security and Communication Networks, vol. 9, No. 18, Available online at https://pdfs.semanticscholar.org/5264/6cb92002e9e2d7d4f968543ca8afa5e68ae5.pdf, Feb. 19, 2017, pp. 5943-5964.

Tan, How Blockchain Can Secure the IoT, Available online at https://www.computerweekly.com/news/252433944/How-blockchain-can-secure-the-IoT, Jan. 29, 2018, 4 pages.

Zhang et al., The IoT Electric Business Model: Using Blockchain Technology for the Internet of Things, Peer-to-Peer Networking and Applications, vol. 10, No. 4 Available online at http://libgen.io/scimag/ads.php?doi=10.1007%2Fs12083-016-0456-1Proposes, Apr. 13, 2016, 12 pages.

* cited by examiner

BLOCKCHAIN BASED DEVICE MANAGEMENT

TECHNICAL FIELD

The present invention generally relates to maintaining information associated with devices. In particular, the present invention relates to using blockchain technology for maintaining information associated with Internet of Things (IoT) devices.

BACKGROUND

Several different types of computing devices have become pervasive in various different types of daily life and work environments. Many of these devices are wirelessly connected to a centralized system that registers and manages these devices. These computing devices are not limited to devices such as smart phones, wearables and laptops, but now also include a more integrated set of computing devices in our environments. For example, automobiles, home appliances, office appliances, vending machine deployments and several other classes of machines now include computing engines with networking (wired/wireless) capabilities and are known as Internet of Things (IoT) devices. Most of these devices connect with a centralized IoT platform that registers and manages these devices and makes information associated with these IoT devices available for various applications, such as diagnostics or business analytics.

BRIEF SUMMARY OF THE INVENTION

Techniques are disclosed herein for employing blockchain technology for managing devices. In certain embodiments, devices may include IoT devices. According to certain embodiments of the disclosure, a blockchain based store of information for IoT device information enables distributed, yet synchronized access to information for the IoT devices. A blockchain based solution also facilitates interoperability between different managing devices and applications using a common and standardized access interface to the information for the IoT devices. A blockchain based solution registers and maintains IoT device information, allowing different managing devices across different geographies and organizations to update information associated with any particular IoT device that they have permissions to update and seamlessly allow multiple applications to access information for the IoT device and interact with the IoT device.

An example apparatus may include memory configured to store at least a portion of a blockchain ledger for managing a plurality of devices, wherein the blockchain ledger comprises a plurality of blocks, each block comprises a plurality of transactions, and each transaction is associated with one of the devices, and wherein each device is configured to exchange data over a cellular network; a network interface configured to receive a first transaction from a computing server, wherein the first transaction comprises a unique identifier and configuration information for a selected one of the devices and a processor configured to execute instructions stored in the memory that, when executed by the processor, cause the processor to determine that the computing server is authorized to issue the first transaction to update the blockchain ledger, and cause the update to the blockchain ledger using the first transaction. In certain embodiments, a blockchain comprising the blockchain ledger is a control channel for a control plane for provisioning the selected device with the configuration information from the first transaction. In certain embodiments, the unique identifier is a serial number, an international mobile equipment identity (IMEI) number, a subscriber identification module (SIM) number, a media access control (MAC) address or any other suitable unique identifier.

In certain embodiments, the selected device is an Internet of Things (IoT) device and is configured to connect to an IoT platform, wherein an IoT device is a device that comprises a network (wired/wireless) connection interface and a computing engine coupled to a machine with mechanically moving parts or environmentally transforming characteristics, wherein the computing engine collects information about the machine and transmits it over the network (wired/wireless) connection interface.

In certain embodiments, the network interface may be further configured to receive a second transaction for the selected device, wherein the second transaction comprises a subscriber identity module number for the selected device from a Home Location Register or a Home Subscriber Server, the instructions executed by the processor may be further configured to determine that the Home Location Register or the Home Subscriber Server are authorized to issue the second transaction to update the blockchain ledger, and cause the update to the blockchain ledger using the second transaction.

In certain embodiments, the apparatus is inside a first organization and coupled, over the network, to a second apparatus configured to store at least the portion of the blockchain ledger inside a second organization. In some embodiments, the apparatus and the second apparatus belong to the same blockchain fabric.

In certain embodiments, the network interface may be further configured to receive a second transaction for the selected device, wherein the second transaction comprises a subscriber identity module number for the selected device from a Home Location Register or a Home Subscriber Server, the instructions executed by the processor may be further configured to determine that the Home Location Register or the Home Subscriber Server are authorized to issue the second transaction to update the blockchain ledger, and cause the update to the blockchain ledger using the second transaction.

In certain other embodiments, the network interface may be further configured to receive a second transaction for the device, wherein the second transaction comprises an indication that the device has been deprecated; and the instructions executed by the processor are further configured to determine that the second transaction is from an authorized source for issuing the second transaction to update the blockchain ledger, and cause the update to the blockchain ledger using the second transaction.

In yet additional embodiments, the network interface may be further configured to receive a second transaction for the device, wherein the second transaction comprises information regarding a configuration update to the device, and the instructions executed by the processor are further configured to determine that the second transaction is from an authorized source for issuing the second transaction to update the blockchain ledger, and cause the update to the blockchain ledger using the second transaction.

In certain embodiments, the network interface may be further configured to receive a request from a second device for information regarding the selected device, and the instructions executed by the processor are further configured to determine a type of information to be disclosed to the second device based on the request and an identity of the second device, and retrieve the information for the selected device from a plurality of transactions for the device from the blockchain ledger.

In certain embodiments, the network interface may be further configured to receive a request for information from a second device associated with the IoT platform for making a determination whether to allow the device on the cellular network; and the instructions executed by the processor are further configured to determine that the device is not allowed to connect to the cellular network, and respond to the second device indicating to the second device to not allow the device on the cellular network.

In certain embodiments, the above disclosure with respect to the apparatus may be performed as a method and/or may be performed from a non-transient computer-readable memory. In addition, certain portions, features or limitations of the above disclosure with respect to the apparatus may be performed as a means for performing such portions, features or limitations.

An example method for performing certain embodiments of the disclosure include receiving a request for device information for a device, wherein the request has a unique identifier for the device, retrieving transactions associated with the device using the unique identifier, wherein the transactions are stored in a blockchain ledger, determining a type of information for the device information to include in the response from the transactions based on access permissions associated with a sender of the request, generating a response that includes device information by aggregating information for the device information from the transactions, and transmitting the device information in the response to the sender of the request.

In certain embodiments, the blockchain ledger may include a plurality of blocks, each block comprises a plurality of transactions, and each transaction is associated with one of the devices, and wherein each device is configured to exchange data over a cellular network.

Certain other aspects of the disclosure may include that the blockchain ledger is part of a blockchain that is a control channel for a control plane for retrieving device information. Furthermore, the device may be an IoT device and may be configured to connect to an IoT platform, wherein an IoT device is a device that comprises a network (wired/wireless) connection interface and a computing engine coupled to a machine with mechanically moving parts or environmentally transforming characteristics, wherein the computing engine collects information about the machine and transmits it over the network (wired/wireless) connection interface.

In certain embodiments, the above disclosure with respect to the method may be performed by a computer system or apparatus and/or by a processor using instructions and data stored on a non-transient computer-readable memory. In addition, certain portions, features or limitations of the above disclosure with respect to the method may be performed as a means for performing such portions, features or limitations.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION OF THE INVENTION

Figure 1:
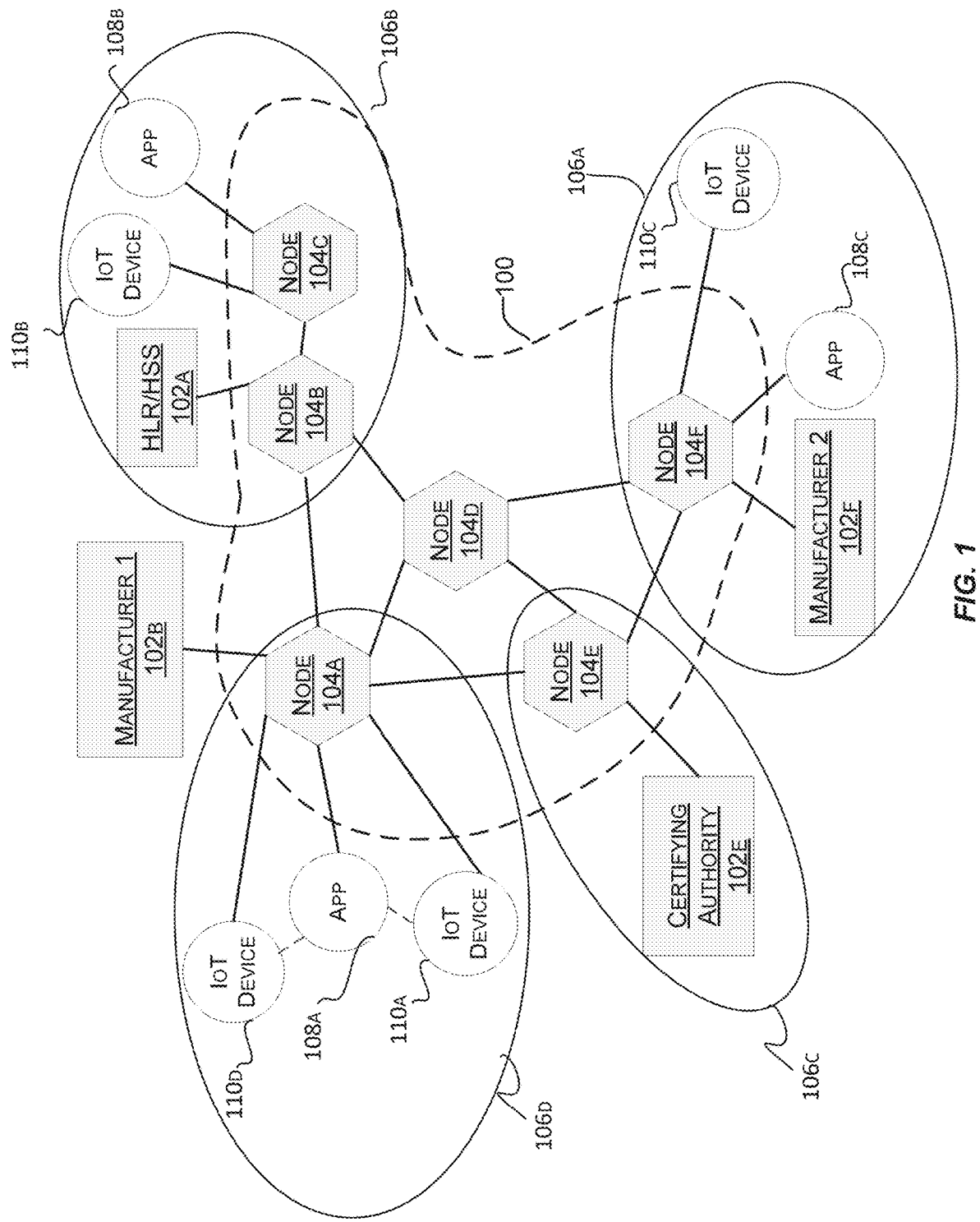
FIG. 1 illustrates an example IoT system using a blockchain fabric, according to certain embodiments of the disclosure.

The present invention generally relates to maintaining information about devices. In particular, the present invention relates to using blockchain technology for maintaining information about Internet of Things (IoT) devices.

IoT devices refers to an endless number of devices that are connected to the internet and/or each other. In certain embodiments, IoT devices may be considered as constrained devices in terms of the availability of processing power, memory and their constrained form factor. Most physical devices can be manufactured to include the functionality of these constrained devices and to operate as IoT devices with some processing, a unique identifier and network (wired/wireless) connectivity. For example, in certain implementations, IoT devices may include devices that include a network (wired/wireless) connection interface and a computing engine coupled to a machine with mechanically moving parts or environmentally transforming characteristics. In such IoT devices, the computing engine collects information about the machine or environment and transmits the information over the network (wired/wireless) connection interface to a remote system for further processing. IoT devices may include home appliances, vehicles, apparel, lighting, healthcare equipment, etc. IoT devices may have additional sensing capability, such as accelerometers, gyroscopes, magnetometers, Global Positioning System (GPS), actuators and other debug and data collecting sensors and circuitry for gathering data regarding the physical device and/or its environment and sharing the information with a remote server. IoT devices may also be referred to as smart devices and may together evolve environments into smart environments, such as smart homes, smart cars, smart work environments and smart factories. For example, a smart home may have various IoT devices that interact with each other to intelligently automate certain tasks, such as maintaining optimal home temperature and lighting conditions. Throughout this disclosure, IoT devices have been extensively discussed. However, it should be noted that in certain implementations, other types of computer systems or devices may be used instead of the IoT devices or in conjunction with the IoT devices without deviating from the scope of this disclosure.

As the number of connected IoT devices increase exponentially, the desirability to efficiently manage and secure IoT devices becomes more complex. Several vendors have developed IoT platforms to manage IoT devices. IoT platforms and solutions are in their infancy and are continuing to evolve. IoT devices generally send data to applications via an IoT platform. Generally, an IoT platform also includes a device registry. The device registry includes the details of an IoT device such as its serial number or international mobile equipment identity (IMEI) or other identifier. The device registry may also include authentication and authorization credentials and keys associated with the device. This enables the device to be authenticated and authorized by the IoT platform to connect to the IoT platform and send/receive data. The device registry is a database that maintains information for the IoT devices. IoT device information is used by applications as well as other platforms involved in providing service.

The device registry enables security in the context of IoT applications. It ensures that only devices that are authorized and known connect and send data. The device registry also provides a means to store metadata associated with the device in terms of the various sensors and data points that are reported to the IoT platform and other applications.

In the IoT ecosystem a number of different managing devices store information associated with any given IoT device and many applications access information associated with that particular IoT device. For example, it may be desirable for a manufacturer, a device provisioning authority, a device certification authority and various vendors to update information and/or access information associated with the IoT devices. Similarly, it may be desirable for different applications executing on different computing devices geographically and organizationally dispersed from each other to access information regarding the IoT devices. Such applications may request access to the identity and associated metadata for the IoT devices. Currently, the IoT ecosystem is fractured into different IoT platforms that have their own implementations of device registries. So managing devices and IoT devices need to implement different protocols for interacting with each of the different IoT platforms. Furthermore, the data for the IoT devices/platforms is centralized to particular vendors or organizations, limiting the use of the IoT devices between multiple IoT ecosystem participants and also making the access to the information highly dependent upon the availability and reliability of the centralized system by the vendor or organization.

According to certain embodiments of the disclosure, a blockchain based store of information for IoT device information enables distributed, yet synchronized, access to information for the IoT devices. A blockchain based solution also facilitates interoperability between different managing devices and applications using a common and standardized access interface to the information for the IoT devices. A blockchain based solution registers and maintains IoT device information, allowing different managing devices across different geographies and organizations to update information associated with any particular IoT device that they have permissions to update and seamlessly allowing multiple applications to access information for the IoT device and interact with the IoT device.

Figure 4:
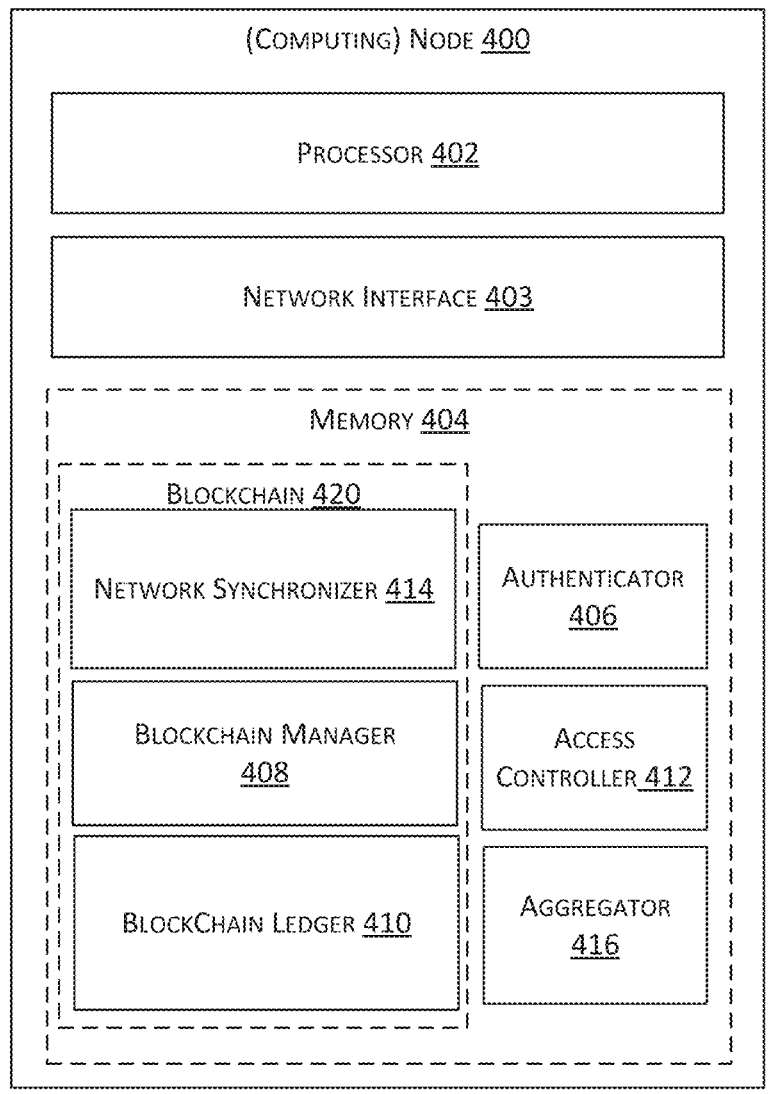
FIG. 4 illustrates an example node, according certain aspects of the disclosure.
Figure 9:
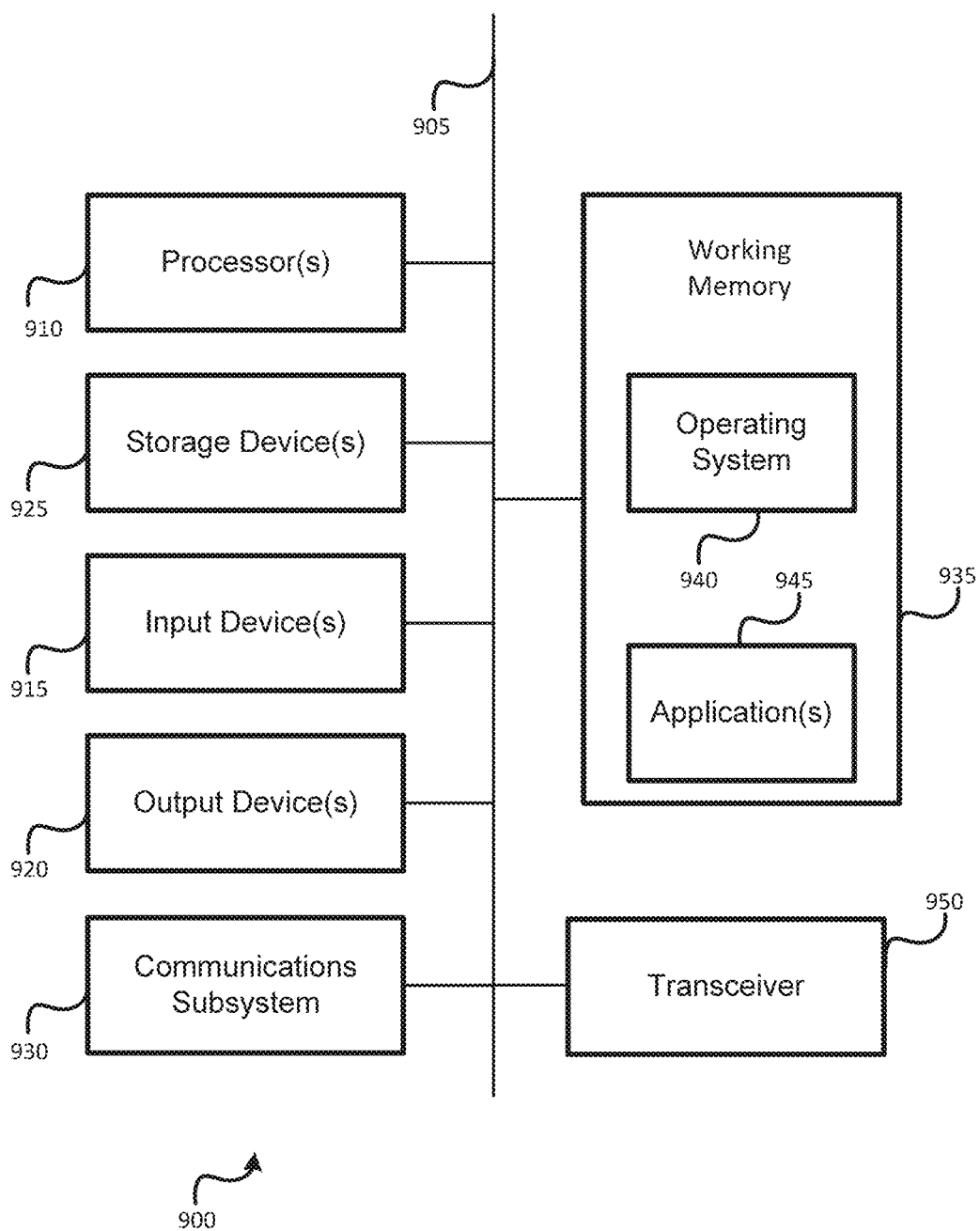
FIG. 9 is an example computer system, according to certain embodiments of the disclosure.

FIG. 1 illustrates an example IoT system using a blockchain fabric 100, according to certain embodiments of the disclosure. FIG. 1 discloses a blockchain fabric 100 comprising a net of (computing) nodes 104*a-f*. FIG. 4 and FIG. 9 disclose example implementations of a node of the blockchain fabric 100. In certain embodiments, several devices connect to the blockchain fabric 100 by connecting to one of the various nodes of the blockchain fabric 100.

Blockchain uses a blockchain ledger that refers to a continuously growing list of records, called blocks, which are linked and secured using cryptography. Each block of the blockchain ledger typically contains a cryptographic hash of the previous block, a timestamp and several transactions. By design, a blockchain ledger is inherently resistant to modification of data that is stored in the blocks. In certain embodiments, for use as a distributed ledger to store IoT device information, the blockchain ledger is managed by a peer-to-peer network (referred to as the blockchain fabric 100), comprising nodes 104-104*f*, collectively adhering to a protocol for inter-node communication and validating new blocks of transactions. Once recorded, the data in any given block cannot be altered retroactively without the alteration of all subsequent blocks, which requires collusion of the network majority.

Every node in the blockchain fabric 100 has synchronized access to the entire blockchain ledger maintained by blockchain fabric 100 with the guarantee that any other node in the blockchain fabric has exactly the same copy or access to the same copy of the entire blockchain ledger. Furthermore, any node in the blockchain fabric 100 can verify the authenticity and integrity of the blockchain ledger by performing cryptographic operations on the hashes embedded in the blocks of the blockchain ledger. Therefore, the blockchain fabric 100 provides distributed access to IoT device information stored as part of the blockchain ledger in a secure, distributed and immutable manner. Furthermore, different organizations can have one or more nodes of the blockchain fabric 100 inside their respective organizations or environment and both access and update the IoT device information from their local copy of the blockchain ledger in the blockchain fabric, knowing that an update to their respective local copy of the blockchain ledger comprising the IoT device information will get validated and propagated throughout the blockchain fabric 100.

Referring back to FIG. 1, the blockchain fabric 100 includes nodes 104*a-f*. As discussed previously, each node may be a server computer, similar to the computer system discussed in FIG. 4 and FIG. 9. Each node may also execute instructions from their respective memory and/or local storage to maintain the blockchain ledger in memory or local storage, interact with other nodes over the network, grant or deny write requests and access requests to the blockchain ledger to various managing devices connected to the node. Furthermore, each node may include instructions that provide graduated permissions to write and access to the blockchain ledger based on the privilege associated with the accessing entity.

FIG. 1 also illustrates several example devices connected to the blockchain fabric 100. For example, FIG. 1 illustrates several manufactures (102b, 102f), a certifying authority 102e, a home location register (HLR)/home subscriber server (HSS) 102a, devices executing applications (108a, 108b, 108c) and IoT devices (110a, 110b and 110c). In certain embodiments, based on its write permissions to the blockchain fabric 100, a device connected to the blockchain fabric 100 can update information associated with any particular IoT device in the blockchain ledger.

FIG. 1 also discloses four example organizations (106a, 106b, 106c, and 106d) that include at least one node from blockchain fabric 100 and several other devices that interact with the blockchain fabric 100 via their respective node. For example, manufacturing organization 106a may be an organization that manufactures IoT devices. The manufacturer 102f of manufacturing organization 106a may manufacture an IoT device and assign a unique identifier to the device. Examples of unique identifiers may include, but are not limited to, an international mobile equipment identifier (IMEI), a serial number (S/N) or a media access control (MAC) address to a device. In certain embodiments, the unique identifier may be stored in non-volatile storage on the IoT device or burned into fuses on the IoT device by the manufacturer 102f. Once the manufacturer 102f assigns a unique identifier to an IoT device, the manufacturer 102f may generate a transaction that includes the unique identifier using its own cryptographic credentials and publish that transaction to the node 104f that is part of the blockchain fabric 100, but may be resident within the manufacturing organization 106a. The blockchain software stack executing on the node 104f may authenticate the identity of the manufacturer 102f using the cryptographic credentials of the manufacturer 102f. Once the identity of the manufacturer 102f is authenticated, the blockchain software stack may allow the manufacturer 102f to store the transaction associated with the IoT device which allows it to write information for the respective IoT device in the blockchain ledger.

The manufacturing organization 106a also discloses an application 108c and an IoT device 110c. Application 108c refers to a device executing an application that uses information associated with an IoT device from the blockchain fabric 100. The device executing the application 108c may be implemented using components disclosed with respect to FIG. 9. As discussed in further detail with respect to FIG. 2, the IoT device 110c in certain instances may receive certain instructions from the manufacturer 102f via the blockchain fabric 100 (through node 104f).

In certain embodiments, once the IoT device is manufactured, the IoT device may be certified by a certifying organization 106c. The certifying organization 106c may include a certifying authority 102e and node 104e of the blockchain fabric 100. For example, in certain embodiments, a certifying organization 106c may validate certain functionality associated with the IoT device, and ascertain the reliability, trustworthiness and/or compliance with certain standards by the IoT device before the IoT device is deployed into certain environments. For example, the certifying organization 106c may verify that the IoT device operates/communicates reliably at certain frequencies needed by a particular vendor, certain other hardware components and/or software components. For example, certain devices may be deployed within government organizations or healthcare organizations and may require additional certification regarding the reliability and trustworthiness of the IoT devices. Once the device is validated for certain functionality, the certifying authority 102e within the certifying organization 106c may generate a transaction to be stored in the blockchain ledger of the blockchain fabric 100. The transaction may include the certification information and the certifying authorities 102e cryptographic credentials. The certifying authority 102e may publish the transaction to the blockchain fabric 100 via its local node 104e. Similar to node 104f, the blockchain software stack executing on the node 104e may authenticate the identity of the certifying authority 102e using the cryptographic credentials of the certifying authority 102e. Once the certifying authority 102e is authenticated, the blockchain software stack may allow the certifying organization 106c to store the transaction associated with the IoT device which allows it to write information for the respective IoT device in the blockchain ledger.

In certain embodiments, a telecommunications operating organization 106b may also provision certain aspects of a given IoT device. For example, the telecommunications operating organization 106b may perform certain enabling or onboarding activity associated with an IoT device, such that the IoT device can communicate over the telecommunication operating organization's network. In certain embodiments, as shown in FIG. 1, the telecommunications operating organization 106b may include an HLR/HSS 102a connected to the blockchain fabric 100 via node 104b. The telecommunications operating organization 106b may further include IoT device 110b and a device executing an application 108b and one or more nodes (104b, 104c) that are connected to the blockchain fabric 100 via node 104c.

In certain embodiments, the HLR/HSS 102a maintains and provides additional unique identifiers and/or configuration information for the IoT devices for operating on the mobile network for the telecommunications operating organization 106b. For example, the HLR/HSS 102a may generate a subscriber identity module (SIM) number for each IoT device it onboards on the mobile network. The HLR is one or more devices that maintains a database of permanent subscriber information for a mobile network. The HLR contains pertinent user information, including address, account status, and preferences. The HLR interacts with the Mobile Switching Center (MSC), which is a switch used for call control and processing. On the other hand, the HSS is one or more devices for maintaining the master user database that supports the network entities that handle the calls/sessions. It contains user profiles, performs authentication and authorization of the user, and can provide information about the physical location of user. The entities that communicate with the HSS are the application server (AS) that hosts and execute services.

In certain embodiments, once the HLR/HSS 102a stores a SIM number for an IoT device, the HLR/HSS 102a may generate a transaction that includes the SIM number, other identification and configuration information for the IoT device and its own cryptographic credentials and publishes that transaction to the node 104b that is part of the blockchain fabric 100, but may be resident within the telecommunications operating organization 106b. As shown in FIG. 4, the blockchain software stack executing on the node 104b may authenticate the identity of the HLR/HSS 102a using the cryptographic credentials of the HLR/HSS 102a and allow the HLR/HSS 102a to store the transaction associated with the IoT device based on allowed access for the HLR/HSS 102a to write information for the respective IoT device on the blockchain ledger.

The telecommunications operating organization 106b may include another node 104c that further extends the blockchain fabric 100 within the organization. The two nodes may be collocated or remotely placed with respect to each other. The telecommunications operating organization 106b may also include an IoT device 110b and a device executing an application 108b that are connected to the blockchain fabric 100 via node 104c. The device executing the application 108b may be implemented using components disclosed with respect to FIG. 9. As discussed in further detail with respect to FIG. 2, the IoT device 110c in certain instances may receive certain provisioning instructions from the manufacturer 102f via the blockchain fabric 100 (through node 104c).

In certain embodiments, vendor organizations, such as vendor organization 106d may also be connected to the blockchain fabric 100. The vendor organization 106d may have one or more computer system (or servers) for executing applications 108a and several IoT devices (110a and 110d). The vendor organization 106d may deploy IoT devices that are manufactured and provisioned with a unique identifier by the manufacturing organization 106a, certified by the certifying organization 106c and provisioned with a SIM number and other configuration information by the telecommunications operating organization 106b. The IoT devices may be collocated or remotely located with respect to each other and the campus of the vendor organization 106d. The application 108a executing on one or more devices in the vendor organization 106d can access all pertinent information regarding the identifiers and configuration associated with a given IoT device by querying its local instance of node 104a for information for any given IoT device that the vendor organization 106d may have access rights to. Upon request from the vendor organization 106d, node 104a may authenticate the vendor organization and aggregate all the information associated with the given IoT device based on access permissions of the vendor organization 106d and provide the information to the vendor organization 106d. In certain embodiments, using the information for the IoT device received from the node 104a, the application 108a can directly communicate with the IoT device.

Figure 2:
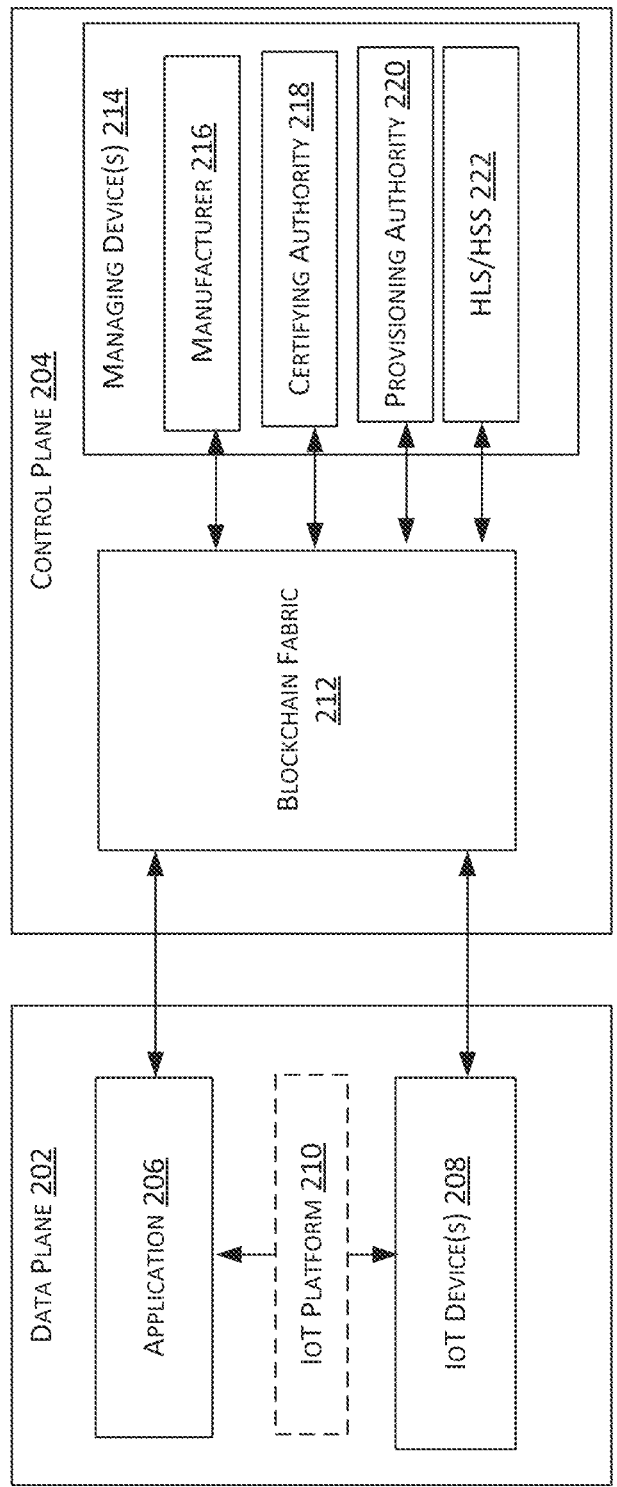
FIG. 2 illustrates another example IoT system using a blockchain fabric, according to certain embodiments of the disclosure.

FIG. 2 illustrates another example IoT system that includes a data plane and a control plane, according to certain embodiments of the disclosure. Several components/devices disclosed in FIG. 2 are similar and use similar techniques as disclosed with respect to FIG. 1. The devices disclosed in FIG. 2 may be similar to the devices disclosed in FIG. 9, and may use one or more components as disclosed with respect to FIG. 9. FIG. 2 discloses a data plane 202 and a control plane 204.

The control plane 204 aggregates identity, configuration and status information associated with any given IoT device in the blockchain fabric 212. The control plane 204 may include managing devices 214 or allow access from managing devices 214 for updating information associated with the IoT devices 208 in the blockchain fabric 212. Examples of managing devices may include manufacturer 216 for manufacturing and provisioning the IoT devices 208 with the unique identifiers, certifying authority 218 for certifying certain functions and trust associated with the IoT devices 208, provisioning authority 220 for provisioning the IoT devices with additional software or configuration information to operate in certain environments or for certain use cases, and an HLS/HSS 222 device for providing configuration information such that the IoT devices 208 can operate on a mobile network operated by a telecommunications operating organization 106b of FIG. 1.

Furthermore, in certain embodiments, the control plane 204 may also update information for the IoT devices 208 with identity and configuration information and access status information from the IoT devices 208. For example, certain managing devices, based on their privilege for accessing the device may trigger update operations on the IoT devices 208 for updating certain configuration information on the IoT devices 208.

Figure 3:
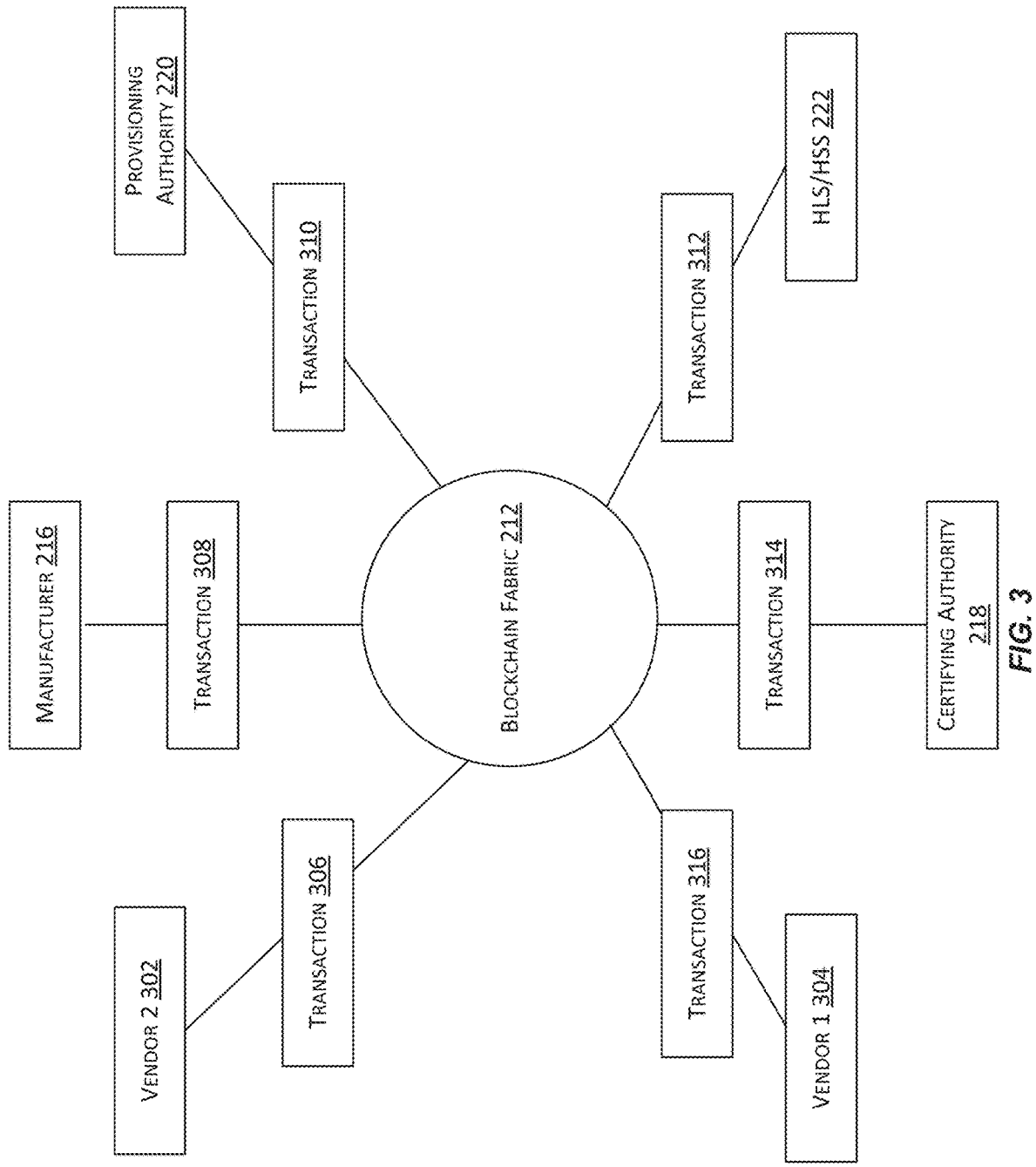
FIG. 3 illustrates management of device information associated with IoT device using a blockchain fabric.

FIG. 3 illustrates management of device information associated with IoT device using a blockchain fabric. In certain instances, as shown in FIG. 3, the control plane 204 may manage the lifecycle for the IoT devices 208 by updating device information associated with the IoT devices 208 in the blockchain fabric 212. For example, the manufacturer 96 may manufacture the IoT devices 208 and provision them with unique identifiers and configuration information. Subsequently, the manufacturer 216 may update the blockchain fabric 212 with the unique identifiers and the configuration information for the IoT devices 208 manufactured by the manufacturer 216 and store this information in the blockchain fabric 212 using transactions 308 via its local node. The provisioning authority 220 may further trigger provisioning of the device with certain software and configuration information using its own transactions 310 via its own local nodes of the blockchain fabric 212. As previously described, the certifying authority 218 may certify the configuration, capabilities and trustworthiness of the IoT devices 208 and also update the blockchain fabric 212 with the certification information by generating and sending its own transactions 314. The HLS/HSS device 222 may update the SIM numbers for the IoT devices 208 and other configuration information in the blockchain fabric 212 using its own transactions 312, so that the IoT devices 208 may operate on the mobile network. In certain embodiments, the updates to the blockchain fabric 212 or special trigger commands to the blockchain fabric 212 may also trigger updates to the IoT devices 208 connected to the blockchain fabric 212 as well.

In certain embodiments, the provisioning authority 220 or other managing devices 214 may also manage the deprecation of the capabilities of the IoT Devices 208. For example, upon determining that an IoT device has been compromised by malicious software or software/hardware that is not capable of defending against credible malicious attacks, one of the managing devices 214 may trigger an update of the IoT device or deprecate the status of the IoT device in the blockchain fabric 212 so that the vendors (302/304) may take corrective actions. Corrective actions may include remotely changing behavior of the IoT device using triggering instructions to the IoT device directly or through the blockchain fabric 212 using transactions 306 or transactions 316. For example, the vendor (302/304) may send an instruction to the IoT device to completely disable the IoT device or deprecate functionality of the IoT device. In certain embodiments, corrective action may simply mean that the vendors stop relying on information received from the compromised IoT device over the data plane 202.

Referring back to FIG. 2, in the data plane 202, the IoT devices 208 may communicate with applications 206 directly or through an IoT platform 210. The IoT platform 210 may still be involved in managing the inclusion of a IoT device in an environment for a vendor. For example, the IoT platform for a vendor may retrieve information for an IoT device from the blockchain ledger and determine that the IoT device is not allowed to connect to the cellular network based on the indicated status of the IoT device in one of the transactions associated with the IoT device.

In certain instances, the IoT devices are configured and managed by the managing devices 214 of the control plane 204 through the blockchain fabric 212. The devices executing the applications 206 can access information associated with the IoT devices 208 using the blockchain fabric 212. Once the IoT devices 208 are configured and the applications 206 can access the information for the IoT devices through the blockchain fabric 212 and ascertain the configuration, trustworthiness and capabilities of the IoT devices 208, the application 206 and the IoT devices 208 can communicate directly in the data plane 202. For example, the IoT devices may send sensor and other information regarding the operating of the IoT device or its environment to the application 206 over the data plane 202. In certain embodiments, it may be desirable to separate out the data plane communications and the control plane communications, since the volume of data produced in the data plane 202 may be exponentially more than the amount of data involved in provisioning and managing the IoT devices 208. Furthermore, the trust level requirements with the communications over the data plane 202 may be lower than the trust level requirements with the communications over the control plane 204, so the communications in the data plane may not need to go through the same authentication and access control mechanisms implemented for the blockchain fabric 212.

FIG. 4 illustrates an example (computing) node 400 of a blockchain fabric, according to certain aspects of the disclosure. In certain embodiments, in addition to the components disclosed in FIG. 4, one more components and/or functionality disclosed with respect to FIG. 9 may also be included in the node 400 of FIG. 4. For example, FIG. 9 discloses a transceiver 950. In certain embodiments, node 400 may also include a transceiver 950 and may wirelessly (or using a wired connection) transmit and receive information instead or in addition to a network interface 403 disclosed in FIG. 4. The components and modules discussed in FIG. 4 may be implemented in hardware, software, firmware or any combination thereof.

Node 400 may include a processor 402 coupled to memory 404. In certain embodiments, the processor 402 may be similar to the processor 910 of FIG. 9. In certain embodiments, the memory 404 may be a non-transient computer-readable medium and/or may be similar to memory 935 of FIG. 9. The processor 402 may load instructions and data from a storage device (not shown) into memory 404 before executing the instructions from the memory 404. For implementing certain aspects of the disclosure, several different modules comprising instructions and data may be loaded into memory. Examples of such modules may include the blockchain ledger 410, blockchain manager 408, authenticator 406, access controller 412 and network synchronizer 414.

Figure 5:
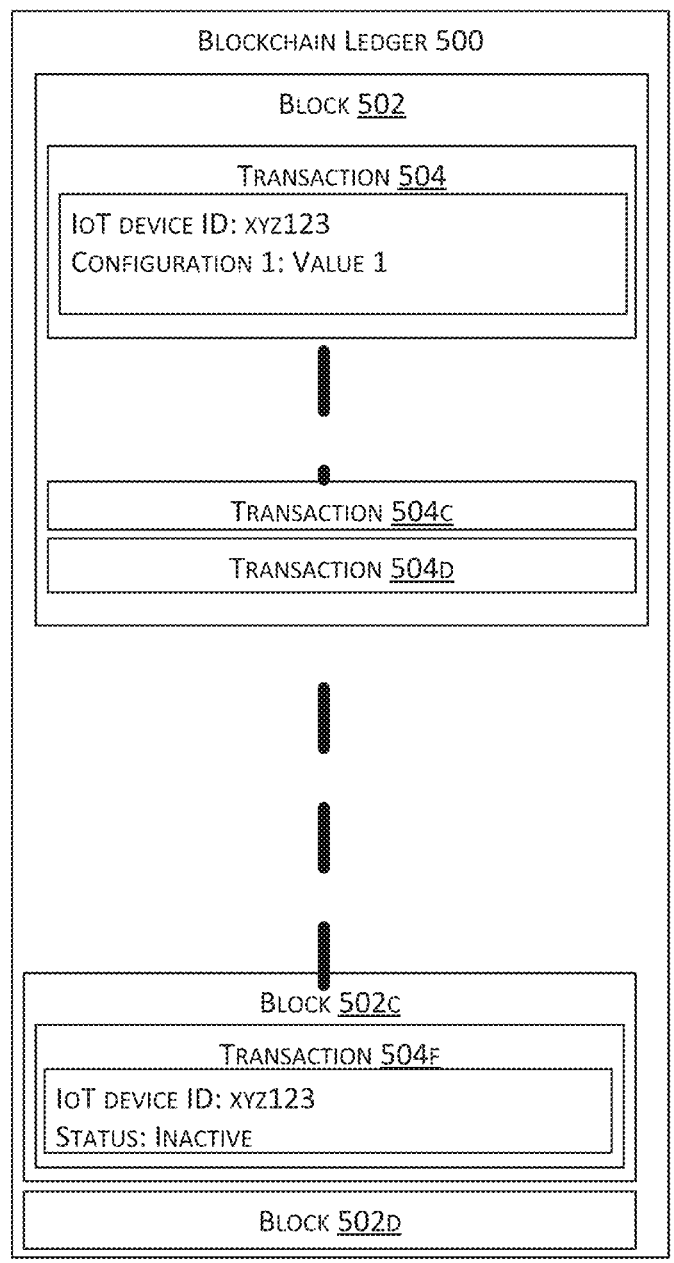
FIG. 5 is an example block diagram that illustrates some aspects of a blockchain ledger, according to certain example embodiments.

The blockchain ledger 410 may also be referred to simply as blockchain or a blockchain data structure. FIG. 5 is an example block diagram that illustrates some aspects of a blockchain ledger 410, according to certain aspects of the disclosure. Momentarily referring to FIG. 5, the blockchain ledger 500 is a data structure that stores the IoT device information and includes a continuously growing list of records, called blocks, which are linked and secured using cryptography. In FIG. 5, the blockchain ledger 500 includes the plurality of blocks—502, 502c, and 502d. Each block includes the plurality of transactions—transactions 504, 504c, 504d in block 502 and transaction 504f in block 502c.

Although, not shown in FIG. 5, each block of the blockchain ledger 500 typically contains a cryptographic hash of the previous block, a timestamp and several transactions. A transaction is a signed data structure expressing a transfer of information. In certain embodiments described herein, transactions are generated by various managing entities, transmitted over the network and included into blocks, made permanent by the blockchain ledger 500.

By design, the blockchain ledger 500 is inherently resistant to modification of data that is stored in the blocks. Therefore, the order and content of the blocks (that includes transactions in each block) are weaved together and as new transactions arrive and consequently new blocks are added using cryptographic hashes (e.g., one way functions), the content of the blockchain ledger 500 becomes immutable. Changing data associated with old transactions is not feasible, since such a change would require regeneration of hashes for every subsequent transaction/block including the block in which the change is desired.

FIG. 5 also illustrates two transactions (504, 504f) that have the same unique identifier for the IoT device. In addition, transaction 504 has configuration information for the IoT device associated with the unique identifier xyz123. However, transaction 504f that is stored at a later time than transaction 504 also indicates that the IoT device is in inactive status. Therefore, upon request of data for the IoT device, the blockchain ledger 500 may refer to the status and determine that device information for an IoT device should not be returned in response, since the transaction indicates the device is inactive.

The blockchain manager 408 manages the blockchain ledger 410. In certain embodiments, the blockchain manager 408 may be referred to as the blockchain core. The blockchain manager 408 is responsible for storing and retrieving transactions from the blockchain ledger 410. In addition, the blockchain manager 408 is responsible for generating hashes while storing of transactions and blocks in the blockchain ledger 410 and also verification of new blocks received via the network interface 403 using cryptographic operations prior to adding such blocks/transactions to the blockchain ledger 410. The blockchain manager 408 also performs peer discovery and manages synchronization with other nodes in the blockchain fabric 212 using network synchronizer 414 via the network interface 403 of the node 400.

The authenticator 406 receives requests, as transactions, from the various managing devices 214, such as the manufacturer 216, certifying authority 218, provisioning authority 220, and/or the HLS/HSS 222 for adding or updating information associated with an IoT device. The authenticator 406 authenticates the source of the transaction using cryptographic means. In other words, the authenticator 406 determines if the request that includes information regarding the identity of the sender of the request is in fact the entity that it claims to be. In certain implementations, the request or the transaction itself may include a digital signature of the sender of the request. The sender of the request may sign the transaction or portions of the transaction with their private key from a private/public key pair unique to the sender. The authenticator 406 may have access to the public key for the sender, using which the authenticator 406 can authenticate or validate the authenticity of the sender.

Once the authenticator 406 authenticates the sender of the request, the access controller 412 determines the level of permissions the sender of the request has for accessing information associated with an IoT device. In certain embodiments, the access controller 412 may store access control information for the various devices connected to the blockchain fabric 212. The access control may be based on the type of device making the access request, the type of access request and the IoT device that the request is for.

In some instances, the sender may have permissions to only store device information for the IoT device using transactions in the blockchain ledger 410. In other instances, the sender may have permissions to only retrieve device information associated with an IoT device. In yet other instances, the sender may have permissions to both store device information and retrieve device information associated with an IoT device. The sender of the request may store information associated with an IoT device by storing a transaction in the blockchain ledger 410. The access controller 412 after determining that the sender of the request is allowed to store information to a specific IoT device may send the request to the blockchain manager 408. On the other hand, a request to retrieve information for an IoT device may be forwarded to the aggregator 416, so that the aggregator can aggregate information associated with the IoT device that may be located in different transactions in the blockchain ledger 410.

As previously discussed, the access control may also be based on the type of device requesting the access. In certain instances, managing devices 214 may have higher levels of access than other devices, such as vendor devices or IoT devices. For example, managing devices may have permissions to store transactions associated with the IoT devices, thus resulting in an update to the device information for the respective IoT device. On the other hand, vendor devices, devices running applications and/or IoT devices may only have read or access permissions to IoT device information.

Furthermore, access to devices may be further subdivided into groups of IoT devices. For example, vendor 1 304 may have access to IoT device information associated with a first group of IoT devices that may be different from a second group of IoT devices that vendor 2 302 may have access to. Similarly, certain managing devices 214 may only have access to certain IoT devices based on the manufacturer, ownership, capabilities, etc. of the IoT device.

For accessing information for an IoT device based on a request, in certain embodiments, an aggregator 416 may aggregate all the information associated with the IoT device from the various transactions associated with the IoT device. In certain implementations, the aggregator 416 may use a unique identifier associated with the IoT device to find the transactions associated with the IoT device and aggregate the information for the IoT device based on the access permissions associated with the access request and provide/generate a response for the request for the device information for the IoT device.

Figure 6:
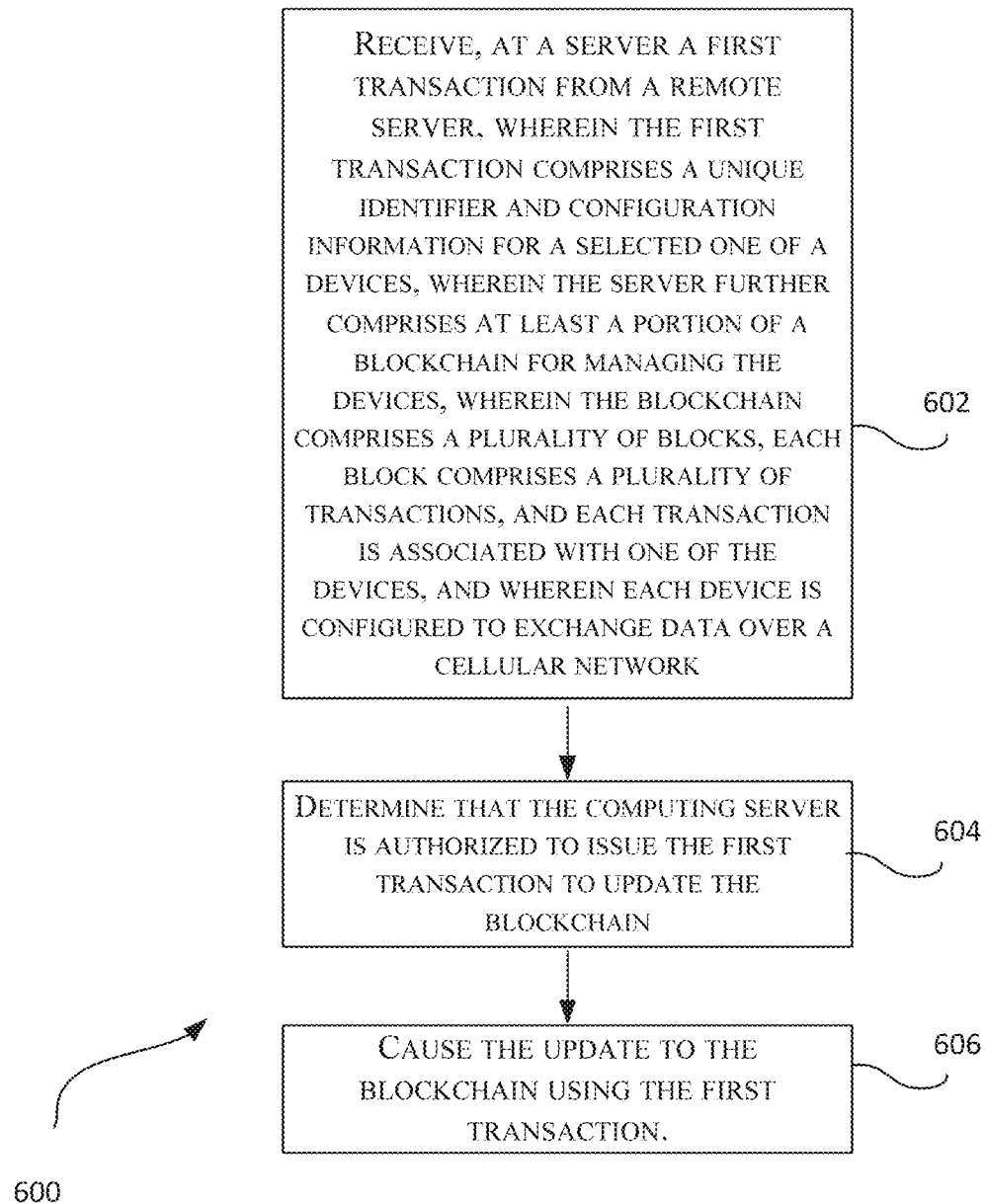
FIG. 6 is a simplified flow diagram, illustrating a process for updating the blockchain ledger.

FIG. 6 is a simplified flow diagram, illustrating a process 600 for updating the blockchain ledger. Blockchain ledger 500 of FIG. 5 is an example of such a blockchain ledger. The process 600 is performed by processing logic that comprises hardware (circuitry, dedicated logic, etc.), software (such as is run on a general purpose computer system or a dedicated machine), firmware (embedded software), or any combination thereof. In one embodiment, the process 600 is performed by one or more computer systems 900 as described in FIG. 9. In certain embodiments, the computer system may also be referred to as a server or computing server.

At block 602, a network interface of the computer system receives a first transaction from a remote server. The first transaction may include a unique identifier and configuration information for an IoT device. In certain embodiments, the unique identifier is an IMEI number. In yet other embodiments, the unique identifier is a serial number, a SIM number or MAC number. The computer system may include a portion of a blockchain ledger for managing the IoT devices. As described with respect to FIG. 5, the blockchain ledger may include a plurality of blocks, each block including a plurality of transactions. Each transaction is associated with one of the IoT devices, and wherein each IoT device is configured to exchange data over a cellular network. In certain embodiments, a blockchain comprising the blockchain ledger is part of a control channel for a control plane for provisioning the selected IoT device with the configuration information from the first transaction. In certain embodiments, the IoT device, as disclosed in further detail in FIG. 8, includes a network (wired/wireless) connection interface and a computing engine coupled to a machine with mechanically moving parts or environmentally transforming characteristics, wherein the computing engine collects information about the machine and transmits it over the network (wired/wireless) connection interface.

At block 604, the computer system determines that the sender is authorized to issue the first transaction to update to the blockchain ledger. In certain embodiments, the authenticator 406 of node 400 of FIG. 4 may authenticate the sender based on the credentials of the sender and access controller 412 of the node 400 of FIG. 4 may determine the access control permissions for storing the transaction based on the type of request, the identity of the sender and the identity of the IoT device that the sender intends to update.

At block 606, the computer system causes the update to the blockchain ledger using the first transaction. In certain embodiments, the blockchain manager 408 may receive the transaction, perform its own verification and update the blockchain ledger by storing the transaction in the blockchain ledger.

In certain embodiments, the network interface is further configured to receive a second transaction for the IoT device, wherein the second transaction comprises a SIM number for the selected device from a HLR or a HSS. The computer system may be further configured to determine that the Home Location Register or the Home Subscriber Server are authorized to issue the second transaction to update the blockchain ledger, and cause another update to the blockchain ledger using the second transaction. In certain other embodiments, the network interface is further configured to receive a third transaction for the IoT device, wherein the third transaction comprises an indication that the device has been deprecated. In response to receiving the third transaction, the computer system determines that the third transaction is from an authorized source for issuing the third transaction to update the blockchain ledger, and causes another update to the blockchain ledger using the third transaction. In yet another embodiment, the network interface is further configured to receive a fourth transaction for the IoT device, wherein the fourth transaction comprises information regarding a configuration update to the IoT device. In response to receiving the fourth transaction, the computer system is configured to determine that the fourth transaction is from an authorized source for issuing the fourth transaction to update the blockchain ledger, and causes the update to the blockchain ledger using the fourth transaction. The sequence of first, second, third and fourth transactions in the disclosure is merely meant to differentiate one transaction from another and does not limit the disclosure to the order of these transactions or occurrence of each of the transactions.

In certain embodiments, the network interface, such as network interface 403, is further configured to receive a request from a second device for information regarding the IoT device. The computer system is configured to determine a type of information to be disclosed to the second device based on the request and an identity of the second device, and retrieve the information for the selected IoT device from a plurality of transactions for the device from the blockchain ledger. In certain embodiments, the blockchain manager 408 and the aggregator 416 of FIG. 4 may work together in retrieving the information for the selected IoT device. In certain other embodiments, the network interface, such as network interface 403, is further configured to receive a request for information from a second device associated with the IoT platform for making a determination whether to allow the IoT device on the cellular network. The computer system may query transactions associated with the IoT device in the blockchain ledger and determine that the IoT device is not allowed to connect to the cellular network. For example, the IoT device may not be found in the blockchain ledger, may be identified as inactive, or may be identified as compromised or untrustworthy. The computer system may then respond to the second device indicating to the second device to not allow the IoT device on the cellular network.

It should be appreciated that the specific steps illustrated in FIG. 6 provide a particular process of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process 600.

Figure 7:
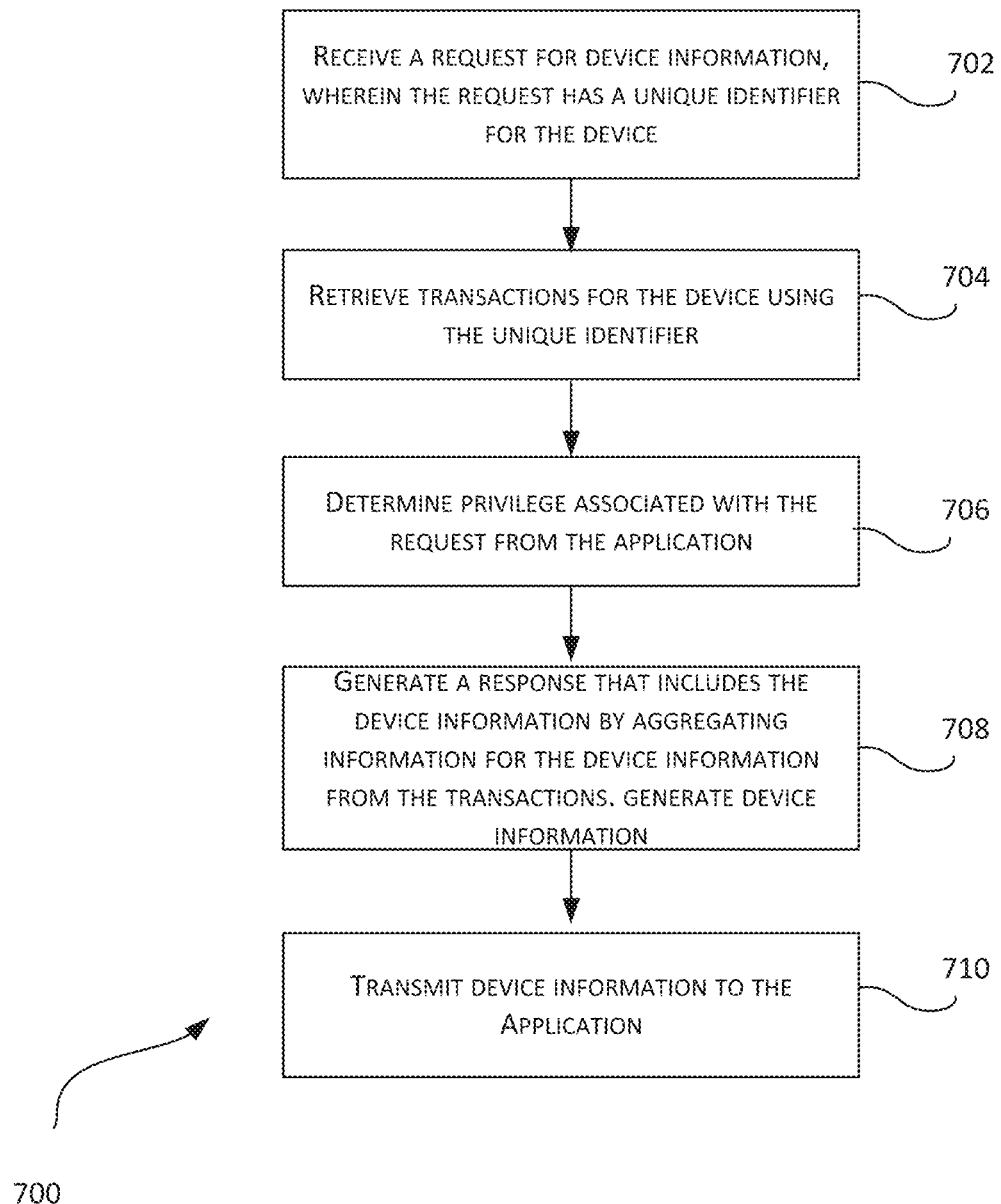
FIG. 7 is a simplified flow diagram, illustrating a process for servicing a request for device information from the blockchain ledger.

FIG. 7 is a simplified flow diagram, illustrating a process 700 for servicing a request for device information from the blockchain ledger. Blockchain ledger 500 of FIG. 5 is an example of such a blockchain ledger. The process 700 is performed by processing logic that comprises hardware (circuitry, dedicated logic, etc.), software (such as is run on a general purpose computer system or a dedicated machine), firmware (embedded software), or any combination thereof. In one embodiment, the process 700 is performed by one or more computer systems 900 as described in FIG. 9. In certain embodiments, the computer system may also be referred to as a server or computing server.

At block 702, the process 700, using a network interface 403 of a computer system, may receive a request for device information for a device, wherein the request has a unique identifier for the device. In certain embodiments, the device is an IoT devices and is configured to connect to an IoT platform, wherein an IoT device is a device that comprises a network (wired/wireless) connection interface and a computing engine coupled to a machine with mechanically moving parts or environmentally transforming characteristics. In certain implementations, the computing engine of the IoT device collects information about the machine and transmits it over the network (wired/wireless) connection interface. In certain aspects of the disclosure, the unique identifier may be a serial number, an IMEI number, a SIM number, a MAC number or any other suitable unique number for identifying the IoT device.

At block 704, the process 700 may retrieve transactions associated with the device using the unique identifier, wherein the transactions are stored in a blockchain ledger. As described in FIG. 5, the blockchain ledger may include a plurality of blocks, each block including a plurality of transactions. Each transaction may be associated with one of the devices. The process 700 may employ the aggregator 416 and the blockchain manager 408 of FIG. 4 in retrieving the transactions associated with the device. In certain embodiments, only active transactions, transactions with valid information or transactions with the most up to date device information may be retrieved. For example, if two transactions comprise similar device information, besides one value that has been updated, the blockchain manager 408 and/or the aggregator 416 may only access the latter transaction that has the updated value.

In certain embodiments, a blockchain comprising the blockchain ledger is a control channel for a control plane for retrieving device information for the selected device.

At block 706, the process 700 may determine a type of information for the device information to include in the response from the transactions based on access permissions associated with a sender of the request. In certain embodiments, the access controller 412 determines the access permissions associated with a request based on the identity of the sender of the request, the type of request and the identity of the device.

At block 708, the process 700 may generate a response that includes device information by aggregating information for the device information from the transactions. In certain embodiments, the aggregator 416 may include different portions of the device information from different transactions based on the sequence, age and/or validity of the transactions and access permissions of the sender of the request.

At block 710, the process 700 may transmit the device information in the response to the sender of the request. In certain embodiments, a network interface 403 may be used for transmitting the response.

It should be appreciated that the specific steps illustrated in FIG. 7 provide a particular process of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process 700.

Figure 8:
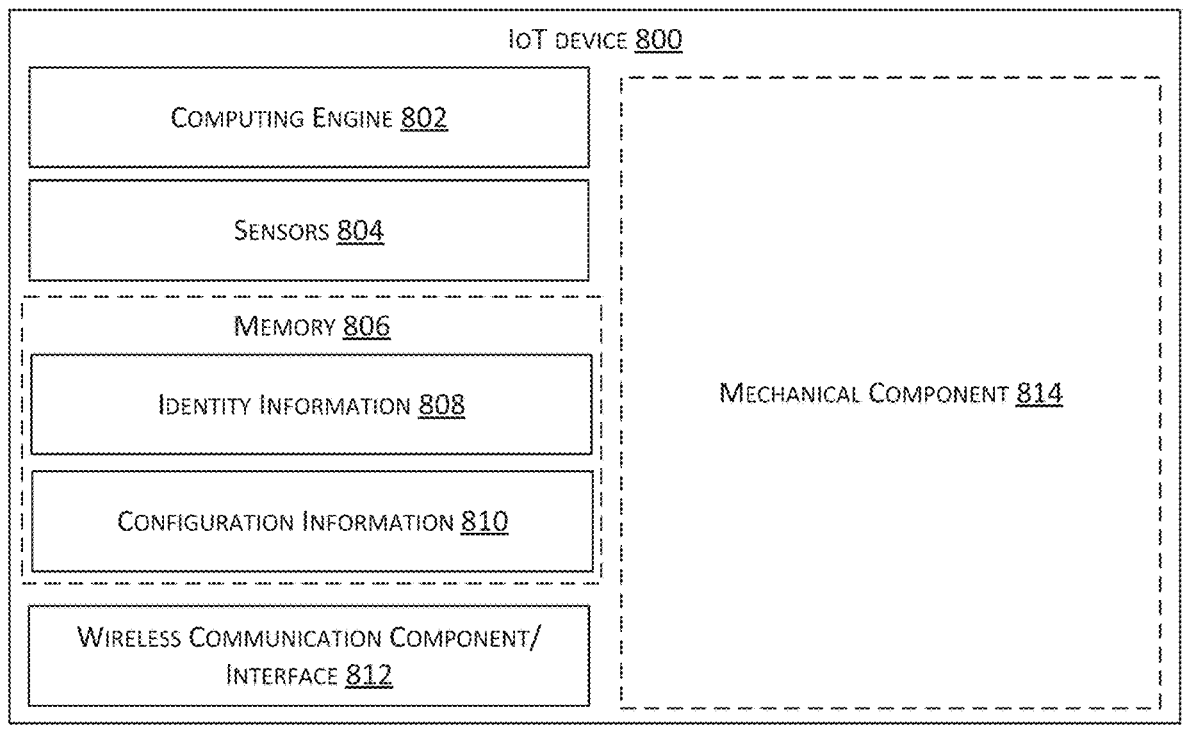
FIG. 8 illustrates an example IoT device, according certain aspects of the disclosure.

FIG. 8 illustrates an example IoT device 800, according certain aspects of the disclosure. IoT devices generally refer to an endless number of devices that are connected to one or more remote devices using a network (wired/wireless) connection. In certain implementations the connection is via the internet. Most physical devices can be manufactured to operate as an IoT device 800 with certain modifications as described herein. For example, in certain implementations, IoT devices may include devices that include a wireless connection interface 812 and a computing engine 802 coupled to a machine or mechanical component 814 that has mechanically moving parts or environmentally transforming characteristics, wherein the computing engine 802 collects information about the machine or environment and transmits the information over the wireless connection interface 812 to a remote system for further processing. IoT devices may include home appliances, vehicles, apparel, lighting, healthcare equipment, etc. IoT devices may have additional sensing capability, using sensors 804 such as accelerometers, gyroscopes, magnetometers, Global Positioning System (GPS), actuators and other debug and data collecting sensor and circuitry for gathering data regarding the physical device and/or its environment and sharing the information with another machine. In certain embodiments, the IoT device 800 may have a wired interface instead or in addition to the wireless connection interface. An IoT device 800 may also be referred to as smart device and may together with other IoT devices evolve environments into smart environments, such as smart homes, smart cars, smart work environments and smart factories. For example, a smart home may have various IoT devices that interact with each other to intelligently automate certain tasks, such as maintaining optimal home temperature and lighting conditions. Throughout this disclosure, IoT devices are discussed as the devices interacting with the blockchain fabric and other entities. However, it should be noted that in certain implementations, other types of computer systems may be used instead of the IoT devices or in conjunction with the IoT devices without deviating from the scope of this disclosure.

In addition, the IoT device 800 may include identity information 808 and configuration information 810 stored on the IoT device 800. In certain embodiments, the identity information 808 and/or configuration information 810 may be stored on the IoT device 800 using non-volatile memory and/or fuses. For example, the identity information 808 may include a unique identifier that may be programmed in by the manufacturer into the IoT device 800. In certain embodiments, the unique identifier may be burned into the fuses of the IoT device such that the identity of the IoT device is immutable. In other embodiments, the identity information 808 may be stored in non-volatile memory 806 and may be updatable. In certain embodiments, the the IoT device 800 may be programmed with several different types of unique identifiers throughout its lifecycle. For example, the manufacturer 216 may program a unique identifier into the IoT device 800 and the HLS/HSS 222 may also program a SIM number into the IoT device 800. The IoT device 800 may also store configuration information 810 in memory in the IoT device 800. The configuration information 810 may include information that enables the IoT device 800 to operate on the mobile network and communicate with the different entities in the IoT ecosystem.

In certain embodiments, in addition to the components disclosed in FIG. 8, one more components and/or functionality disclosed with respect to FIG. 9 may also be included in the IoT device 800 of FIG. 8.

In some embodiments, the computer system 900 may receive a second message within a predefined time period and may forward the second message for delivery to the public safety answering point, wherein delivery of the second message is based on the emergency service routing number. The second message may be associated with the same mobile station 90 or 1110.

A computer system as illustrated in FIG. 9 may be incorporated as part of the previously described entities shown in FIGS. 1, 2, 3, 4, and 8. For example, computer system 900 can represent some of the components of the managing devices 214, the node 400 of the blockchain fabric 212, or the IoT device 800. In addition, the computer system of FIG. 9 may also disclose mobile devices and/or the computer systems discussed in this application. FIG. 9 provides a schematic illustration of one embodiment of a computer system 900 that can perform the methods provided by various other embodiments, as described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 may also include a communications subsystem 930, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 may also include a transceiver 950 for transmitting and receiving messages. The transceiver 950 may comprise components, such as a transmitter and a receiver which are combined and share common circuitry or a single housing or may be separate. The transceiver 950 may be modified to communicate with one or more network configurations, such as GSM, a CDMA, a WCDMA, a CMDA2000 1×RTT, or a LTE network.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as the system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computer system such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. Computer readable storage medium does not refer to transitory propagating signals. In an embodiment implemented using the computer system 900, various computer-readable media might be involved in providing instructions/code to processor(s) 910 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the embodiments described herein. Also, a number of steps may be undertaken before, during, or after the above elements are considered. Accordingly, the above description does not bound the scope of the claims.

What is claimed is:

1. An apparatus, comprising:
    memory configured to store at least a portion of a blockchain ledger for managing a plurality of devices, wherein the blockchain ledger comprises a plurality of blocks, each block of the plurality of blocks comprises a plurality of transactions, and each transaction of the plurality of transactions is associated with one of the plurality of devices, and wherein each device of the plurality of devices is configured to exchange data over a cellular network;

a network interface configured to:
receive a first transaction from a computing server, wherein the first transaction comprises a unique identifier and configuration information for a selected device from the plurality of devices; and
receive a second transaction for the selected device, wherein the second transaction comprises a subscriber identity module number for the selected device from a Home Location Register or a Home Subscriber Server; and a processor configured to execute instructions stored in the memory that, when executed by the processor, cause the processor to:
determine whether the computing server is authorized to issue the first transaction to update the blockchain ledger;
cause a first update to the blockchain ledger using the first transaction;
determine whether the Home Location Register or the Home Subscriber Server are authorized to issue the second transaction to update the blockchain ledger; and
cause a second update to the blockchain ledger using the second transaction.

2. The apparatus of claim 1, wherein a blockchain comprising the blockchain ledger is a control channel for a control plane for provisioning the selected device with the configuration information from the first transaction.

3. The apparatus of claim 1, wherein determining whether the computing server is authorized to issue the first transaction to update the blockchain ledger occurs prior to updating the blockchain ledger using the first transaction, and wherein
determining whether the Home Location Register or the Home Subscriber Server are authorized to issue the second transaction to update the blockchain ledger occurs prior to updating the blockchain ledger using the second transaction.

4. The apparatus of claim 1, wherein the selected device is an Internet of Things device and is configured to connect to an Internet of Things platform, wherein the Internet of Things device comprises a wireless connection interface and a computing engine coupled to a machine with mechanically moving parts or environmentally transforming characteristics, wherein the computing engine collects information about the machine and transmits the information over the wireless connection interface.

5. The apparatus of claim 1, wherein the unique identifier is an international mobile equipment identity number.

6. The apparatus of claim 1, wherein
the network interface is further configured to receive a third transaction for the selected device, wherein the third transaction comprises an indication that the selected device has been deprecated; and
the instructions executed by the processor are further configured to:
determine whether the third transaction is from an authorized source for issuing the third transaction to update the blockchain ledger; and
responsive to determining that the third transaction is from an authorized source, cause the update to the blockchain ledger using the third transaction.

7. The apparatus of claim 1, wherein
the network interface is further configured to receive a third transaction for the selected device, wherein the third transaction comprises information regarding a configuration update to the selected device; and
the instructions executed by the processor are further configured to
determine that the third transaction is from an authorized source for issuing the third transaction to update the blockchain ledger; and
responsive to determining that the third transaction is from an authorized source, cause the update to the blockchain ledger using the third transaction.

8. The apparatus of claim 1, wherein
the network interface is further configured to receive a request from a third device for information regarding the selected device; and
the instructions executed by the processor are further configured to:
determine a type of information to be disclosed to the selected device based on the request and an identity of the third device; and
retrieve the information for the selected device from the blockchain ledger.

9. The apparatus of claim 1, wherein
the network interface is further configured to receive a request for information from a second device associated with an Internet of Things platform for making a determination whether to allow the selected device on the cellular network; and
the instructions executed by the processor are further configured to:
determine whether the selected device is not allowed to connect to the cellular network; and
responsive to determining that the selected device is not allowed to connect to the cellular network, respond to the second device indicating to the second device to not allow the selected device on the cellular network.

10. The apparatus of claim 1, wherein the apparatus is inside a first organization and coupled, over a network, to a second apparatus configured to store at least the portion of the blockchain ledger inside a second organization.

11. A method, comprising:
receiving, at a computer system a first transaction from a remote computer system, wherein the first transaction comprises a unique identifier and configuration information for a selected device from a plurality of devices, wherein the computer system further comprises at least a portion of a blockchain ledger for managing the plurality of devices, wherein the blockchain ledger comprises a plurality of blocks, each block of the plurality of blocks comprises a plurality of transactions, and each transaction of the plurality of transactions is associated with one of the devices from the plurality of devices, and wherein each device from the plurality of devices is configured to exchange data over a cellular network;
determining whether the remote computer system is authorized to issue the first transaction to update the blockchain ledger;
causing a first update to the blockchain ledger using the first transaction;
receiving, at the computer system a second transaction for the selected device, wherein the second transaction comprises a subscriber identity module number for the selected device from a Home Location Register or a Home Subscriber Server;

determining whether the Home Location Register or the Home Subscriber Server are authorized to issue the second transaction to update the blockchain ledger; and causing a second update to the blockchain ledger using the second transaction.

12. The method of claim 11, wherein a blockchain that includes the blockchain ledger is a control channel for a control plane for provisioning the selected device with the configuration information from the first transaction.

13. The method of claim 11,
wherein determining whether the remote computer system is authorized to issue the first transaction to update the blockchain ledger occurs prior to updating the blockchain ledger using the first transaction; and
wherein determining whether the Home Location Register or the Home Subscriber Server are authorized to issue the second transaction to update the blockchain ledger occurs prior to updating to the blockchain ledger using the second transaction.

14. The method of claim 11, wherein the selected device is an Internet of Things device and is configured to connect to an Internet of Things platform, wherein an Internet of Things device is a device that comprises a wireless connection interface and a computing engine coupled to a machine with mechanically moving parts or environmentally transforming characteristics, wherein the computing engine collects information about the machine and transmits the information over the wireless connection interface.

15. The method of claim 11, wherein the unique identifier is an international mobile equipment identity number.

16. A method comprising:
receiving, a request for device information for a device, wherein the request has a unique identifier for the device;
retrieving transactions associated with the device using the unique identifier, wherein the transactions are stored in a blockchain ledger, wherein the unique identifier comprises a subscriber identity module number for the device from a Home Location Register or a Home Subscriber Server and wherein the transactions were issued by a Home Location Register or a Home Subscriber Server, and wherein the blockchain ledger comprises a plurality of blocks, each block of the plurality of blocks comprises a plurality of transactions, and each transaction of the plurality of transactions is associated with one of devices from a plurality of devices, and wherein each device from the plurality of devices is configured to exchange data over a cellular network;

determining a type of information from the transactions to include in a response to the request based on access permissions associated with a sender of the request;

generating the response that includes the device information by aggregating information for the device information from the transactions; and transmitting the response to an equipment of the sender of the request.

17. The method of claim 16, wherein a blockchain comprising the blockchain ledger is a control channel for a control plane for retrieving device information.

18. The method of claim 16, wherein the device is an Internet of Things device and is configured to connect to an Internet of Things platform, wherein an Internet of Things device is a device that comprises a wireless connection interface and a computing engine coupled to a machine with mechanically moving parts or environmentally transforming characteristics, wherein the computing engine collects information about the machine and transmits the information over the wireless connection interface.

19. The method of claim 16, wherein the request comprises a digital signature of the sender.

20. The method of claim 16, further comprising storing a record of the request in the blockchain ledger.

* * * * *